3,464,392
HOG CHUTE
Ernest G. Hoyme, Box 1327, and Clifford L. Hoyme, 8 Montcalm Ave., both of Camrose, Alberta, Canada
Filed Aug. 28, 1967, Ser. No. 663,649
Int. Cl. A61d 3/00
U.S. Cl. 119—103                                       12 Claims

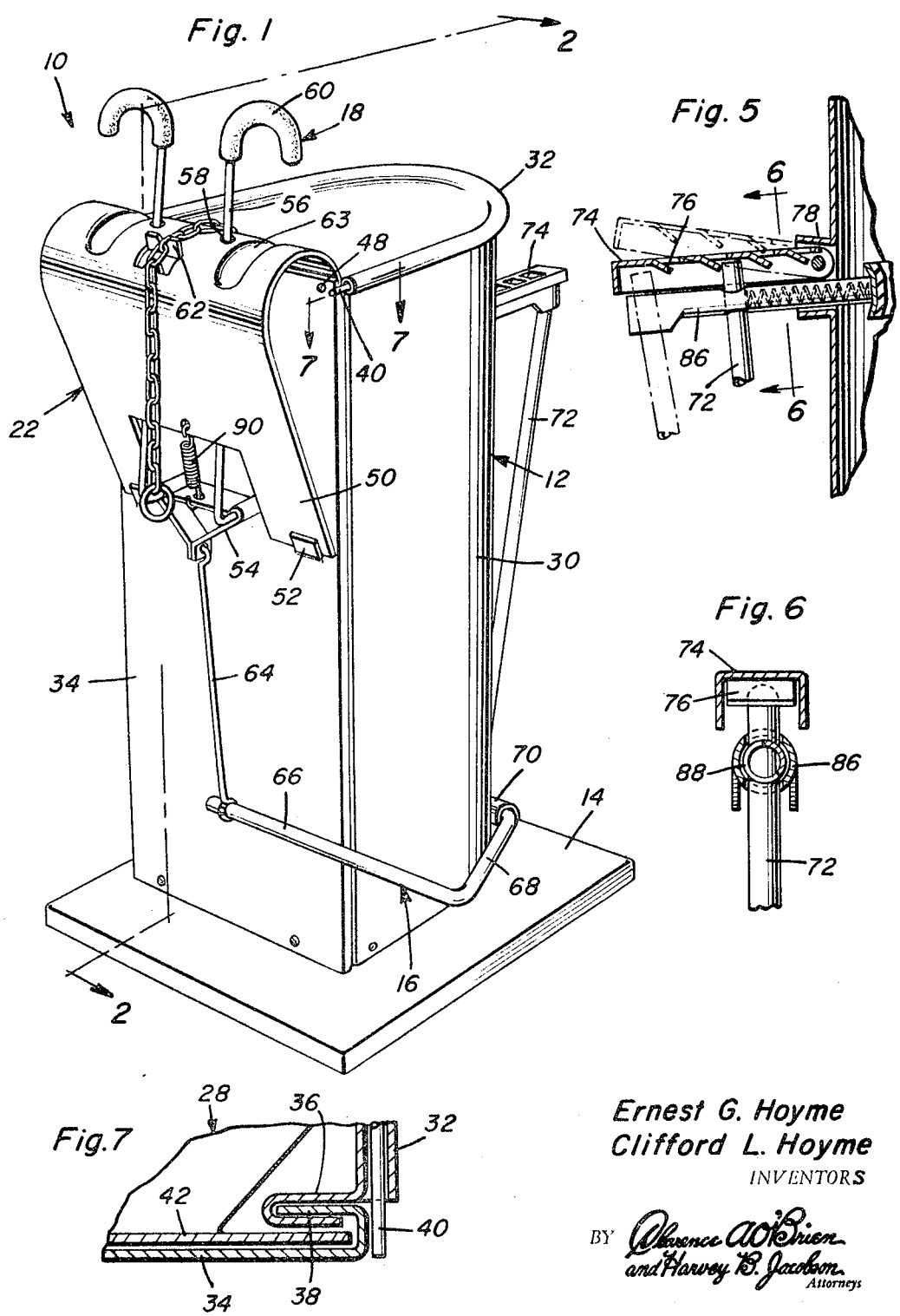

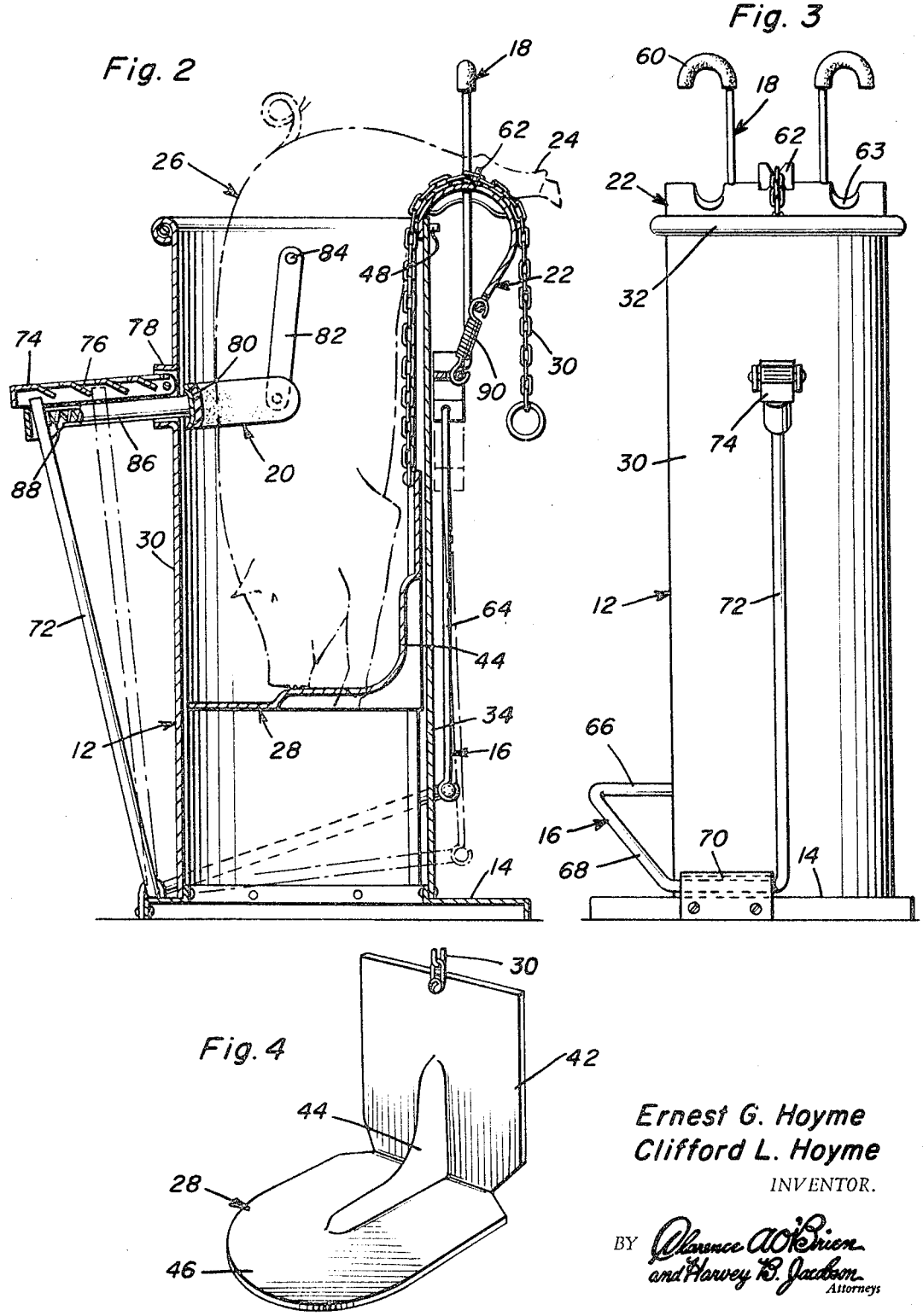

ABSTRACT OF THE DISCLOSURE

A device for holding and restraining small pigs when performing castration, doctoring and tattooing operations. The animal is inserted head first or tail end first into a vertical housing or chute from which an arcuate leg rest extends having recesses receiving the legs of the animals. By foot pedal action, leg clamps and a body restraining compression element are simultaneously engaged with the animal to immobilize it.

This invention relates to animal restraining devices of the type disclosed for example in my prior Patent No. 2,929,357.

The present invention is concerned with the provision of an animal holding and restraining device capable of more completely immobilizing small pigs placed therein. Further, the device of the present invention is of a novel construction that is light in weight and provided with facilities for more efficiently handling animals.

In accordance with the present invention, a vertically elongated housing is formed from a curved wall interconnected with a flat wall by inter-leaved corner flanges held locked in assembled relation by rods projecting from a tubular rim formed at the upper end of the curved wall. A curved leg rest member is mounted on the flat wall adjacent the upper end thereof and extends away from the housing so as to receive the legs of the animal within spaced recesses formed in the leg rest member for this purpose. A pair of leg clamps slidably mounted by the leg rest member overlie the leg receiving recesses in the leg rest member and are displaced downwardly into engagement with the animal legs simultaneously with transverse movement of a body restraining compression element embracing the mid-section of the animal within the housing. A pedal actuated linkage mechanism operates both the leg clamps and the body restraining compression element which is held in an engaged position by a pivoted one-way lock device mounted on the housing for engagement with the upper end of a lever arm associated with the pedal actuated linkage. The housing is also provided with a slidably mounted platform supporting the lower end of the animal, the platform being locked in an adjusted position by means of a chain extending over a locking tab formed on the leg rest member between the leg clamps.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the animal holding and restraining device of the present invention.

FIGURE 2 is a side sectional view taken substantially through a plane indicated by section line 2—2 in FIGURE 1.

FIGURE 3 is a front elevational view of the device.

FIGURE 4 is a perspective view of the sliding platform associated with the device.

FIGURE 5 is a partial sectional view showing the one-way locking device associated with the apparatus of the present invention.

FIGURE 6 is a partial sectional view taken substantially through a plane indicated by section line 6—6 in FIGURE 5.

FIGURE 7 is an enlarged partial sectional view taken substantially through a plane indicated by section line 7—7 in FIGURE 1.

Referring now to the drawings in detail, it will be observed from FIGURE 1 that the apparatus of the present invention generally referred to by reference numeral 10 includes a vertically elongated housing 12 extending upwardly from a base 14 to which it is secured in any suitable fashion. Also movably mounted on the base is an actuating linkage mechanism generally referred to by reference numeral 16 through which a pair of leg clamps 18 are operated simultaneously with a body restraining mechanism 20 more clearly seen in FIGURE 2. The leg clamps 18 cooperate with a leg rest member 22 mounted on the housing in order to clamp the legs 24 of an animal such as the small pig 26 shown by dotted line in FIGURE 2.

It will become apparent therefore, that the animal 26 is inserted through the open upper end of the housing 12 either head first as illustrated or tail end first. The lower end of the animal is supported on a platform 28 slidably mounted within the housing and displaceable to an adjusted position by means of a flexible chain 30 connected thereto. When the animal is inserted into the housing, the legs 24 are supported on the leg rest member 22 and the animal is immobilized by the leg clamps 18 and the body restraining mechanism 20 engaging the mid-section of the animal.

The housing 12 is constructed from two sheet metal parts consisting of a curved wall 30 having a tubular rim 32 at the upper end and a flat wall 34. The walls 30 and 34 are interconnected at corner forming edge portions by interleaved, folded connecting flanges 36 and 38 as more clearly seen in FIGURE 7. The connecting flanges are held assembled or locked to each other by means of a lock rod 40 projecting from opposite ends of the tubular rim 32. The corner flanges also form at opposite vertical edges of the flat wall 34, a guideway for the vertical portion 42 of platform 28. As more clearly seen in FIGURES 2 and 4, a reinforcing rib 44 extends between the vertical portion 42 and the horizontal portion 46 of the platform in order to form a firm support for the lower end of the animal. Connected to the upper end of the vertical portion 42, is a flexible chain 30 by means of which the position of the platform is adjusted.

The platform adjusting chain 30 extends upwardly from the platform within the housing and over the leg rest member to engage the lock tab 62 between the leg clamps 18. The leg rest member is connected by fasteners 48 to the upper end of the flat wall 34 and extends outwardly from the housing and downwardly into engagement with the flat wall spaced below the upper end thereof. The lower end portion of the leg rest member is accordingly provided with leg portions 50 received between the flat wall 34 and struck out tabs 52 that project upwardly at an angle to the flat wall. The leg portions 50 straddle a connecting bracket 54 to which the leg clamps are connected at the lower end.

The leg clamps include vertical rods 56 that extend upwardly from the bracket 54 through guide holes 58 formed in the leg rest member. Curved rubber covered end portions 60 are formed at the upper ends of the leg clamps overlying the arcuate leg receiving recesses 63 formed in spaced relation at the upper end of the leg rest member within which the legs of the animal are received.

The leg clamps 18 are interconnected by means of the bracket 54 with the upper end of a pull rod 64 associated with the pedal actuated linkage 16. A return spring 90 interconnects the bracket 54 and the leg rest member. The lower end of the pull rod is connected to a horizontal arm 66 at a grooved or recessed end portion The arm 66 is an extension of a pedal formation 68 pivotally mounted on the base 14 by the pivot bracket 70. The pedal formation 68 extends upwardly at an angle from the pivot bracket 70 on one side of the housing and is connected to an upwardly extending lever arm 72. The upper end of the lever arm is engageable with a pivoted one-way lock member 74 having locking projections 76. The locking member 74 is pivotally mounted by means of a pivotal mounting formation 78 extending from the curved wall of the housing opposite the flat wall 34 as shown in FIGURES 2 and 5. Thus, when the pedal portion 68 of the linkage is downwardly displaced, the pull rod 64 downwardly displaces the leg clamps 18 and at the same time angularly displaces the lever arm 72 toward the housing. The lever arm and the linkage is prevented from returning to its retracted position under the bias of return spring 90 by means of the one-way locking projection 76 on the locking member 74. The locking member may be released however from the linkage by merely upwardly displacing the locking member as shown by dotted line in FIGURE 5. It will be apparent therefore, that the locking member will releasably hold the actuating linkage in an animal engaging position wherein the leg clamps 18 engage the legs of the animal to hold them on the leg rest member while the body restraining mechanism 20 is held in an engaging position by the lever arm 72.

The body restraining mechanism 20 includes an arcuate compression element 80 the opposite ends of which are pivotally connected to the lower ends of suspension links 82 pivotally mounted at their upper ends by pivot pins 84 within the housing, as more clearly seen in FIGURE 2. Thus, the compression element 80 is pivotally suspended within the housing in embracing relation to the mid-section of the animal inserted therein. Connected to the compression element and extending through the housing closely below the pivoted locking member 74, is a tubular rod 86 within which a coil spring 88 is disposed. The tubular rod 86 is slotted so that the lever arm 72 extends therethrough and engages the coil spring 88 through which displacing force is transmitted to the pivotally suspended compression element in a direction transverse of the housing. Thus, when the pedal portion 68 is downwardly depressed by the foot of the operator, against the bias of a return spring 90, the compression element 80 is displaced inwardly into engagement with the body of the animal and held in such engaged position by the one-way locking member 74 at the same time that the leg clamps are downwardly displaced into engagement with the animal legs received in the recesses 63 of the leg rest member.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An animal holding device comprising a base, an elongated housing extending upwardly from the base having an upper open end, an arcuate leg rest member connected to said upper end of the housing extending outwardly therefrom, leg clamps slidably extending through the leg rest member in spaced relation to the housing, body restraining means mounted within the housing for movement toward the leg rest member transversely of the housing, and actuating means connected to the leg clamps and the restraining means for simultaneous displacement thereof in transverse directions toward each other to engage the legs and body of an animal inserted into the housing through the upper open end.

2. The combination of claim 1 including releasable one-way lock means mounted on the housing and engageable with the actuating means for preventing release of the leg clamps and the body restraining means from engaging positions.

3. The combination of claim 2 wherein said restraining means comprises an arcuate compression element pivotally suspended within the housing, a tubular rod connected to the compression element and extending out of the housing and spring means mounted within the tubular rod in engagement with the actuating means for transmitting a displacing force to the compression element transversely of the housing.

4. The combination of claim 3 wherein said actuating means comprises a pedal portion pivotally mounted on the base, a lever arm connected to the pedal portion and extending through the tubular rod into engagement with the one-way lock means, a pull rod connecting the pedal portion to the leg clamps and a return spring connecting the leg clamps to the leg rest member.

5. The combination of claim 4 wherein said housing includes a curved wall having a tubular rim at the upper end of the housing, a flat wall to which the leg rest member is connected said flat and curved walls having interleaved corner connecting flanges, and an elongated lock rod mounted in the tubular rim and projecting therefrom in locking relation to the corner connecting flanges at the upper end of the housing.

6. The combination of claim 5 including a platform adjustably positioned within the housing, a flexible chain connected to the platform and extending upwardly therefrom over the leg rest member between the leg clamps, and a locking tab projecting from the leg rest member holding the chain in an adjusted position of the platform.

7. The combination of claim 1 wherein said retaining means comprises an arcuate compression element pivotally suspended within the housing, a tubular rod connected to the compression element and extending out of the housing and spring means mounted within the tubular rod in engagement with the actuating means for transmitting a displacing force to the compression element transversely of the housing.

8. The combination of claim 1 wherein said actuating means comprises a pedal portion pivotally mounted on the base, a lever arm connected to the pedal portion and extending into engagement with the restraining means, a pull rod connecting the pedal portion to the leg clamps and a return spring connecting the leg clamps to the leg rest member.

9. The combination of claim 8 including releasable one-way lock means mounted on the housing and engageable with the lever arm for preventing release of the leg clamps and the body restraining means from engaging positions.

10. The combination of claim 1 wherein said housing includes a curved wall having a tubular trim at the upper end of the housing, a flat wall to which the leg rest member is connected said flat and curved walls having interleaved corner connecting flanges, and an elongated lock rod mounted in the tubular rim and projecting therefrom in locking relation to the corner connecting flanges at the upper end of the housing.

11. The combination of claim 10 including a platform adjustably positioned within the housing, a flexible chain connected to the platform and extending upwardly therefrom over the leg rest member between the leg clamps, and a locking tab projecting from the leg rest member holding the chain in an adjusted position of the platform.

12. The combination of claim 1 including a platform adjustably positioned within the housing, a flexible chain connected to the platform and extending upwardly therefrom over the leg rest member between the leg clamps, and a locking tab projecting from the leg rest member holding the chain in an adjusted position of the platform.

References Cited

UNITED STATES PATENTS

| | | | |
|---|---|---|---|
| 2,789,538 | 4/1957 | Merritt | 119—103 |
| 2,929,357 | 3/1960 | Hoyme et al. | 119—103 X |
| 3,138,141 | 6/1964 | Poage | 119—103 |

HUGH R. CHAMBLEE, Primary Examiner